Aug. 7, 1928.

G. W. KNUTSON

AUTOMOBILE WINDSHIELD CLEANER

Filed Oct. 10, 1927

1,679,576

Inventor

George W. Knutson

By Clarence A. O'Brien
Attorney

Patented Aug. 7, 1928.

1,679,576

UNITED STATES PATENT OFFICE.

GEORGE W. KNUTSON, OF ARLINGTON, SOUTH DAKOTA.

AUTOMOBILE WINDSHIELD CLEANER.

Application filed October 10, 1927. Serial No. 225,153.

This invention relates to improvements in windshield cleaners, the same being adapted particularly for the scraping and wiping of automobile windshields.

There are a number of windshield wipers of various types on the market, some of them being more or less practical for the purpose of removing water from the windshield surfaces, but none of these devices being practical for the purpose of effectively removing frost or ice therefrom.

An object of my invention is to provide a windshield cleaner, which is not only effective for removing water from the surfaces thereof, but which will also be very practical in service for completely removing any frost or ice formation thereon.

Another object resides in the particular means by which my device operates.

Still another object resides in the arrangement of parts whereby the same may be easily demounted when not desired for service.

Other very novel objects and advantages of my invention will become apparent as the same is better understood from the specification and claims to follow.

In the drawing:—

Figure 1:
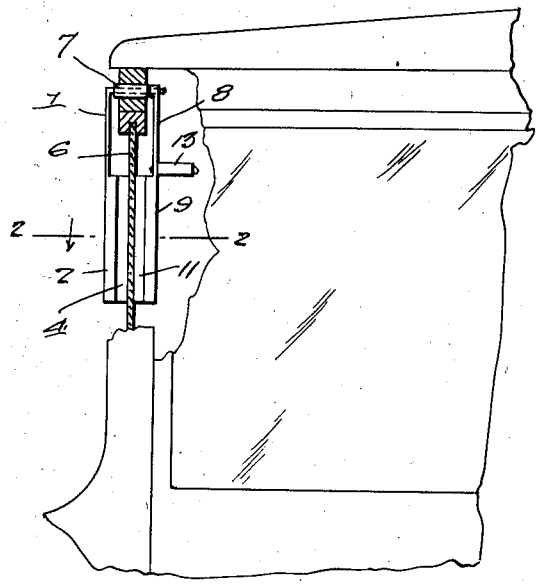
Figure 1 is a fragmentary view of a conventional automobile, with the upper portion of the windshield and frame thereof in vertical sectional view, and showing my improved windshield cleaner in operative position in respect thereto.

Now for a more detailed explanation of my invention, I refer to the drawings in which like numerals designate like parts of the same. An inverted L-shaped arm 1 has the lower end of its depending leg member secured in any manner desired to the upper end of an elongated support 2. The support is preferably constructed of material substantially triangular in cross sections, except that at the longitudinal edges of the inner surface, the vertically right angular walls 3 are provided.

In each of these right angular wall surfaces, an elongated obliquely formed slot is formed in each of which is secured one longitudinal edge of a scraper blade 4. The free longitudinal edge of the blade is preferably sharpened for scraping relation against the surface of a windshield. At the inner surface of the support, is a longitudinal groove extending the full length of the same and in which is secured one longitudinal edge of a flexible squeegee element 5.

For the purpose of illustration, as is shown in Fig. 1 of the drawings, the usual upper frame of the windshield 6 of a conventional automobile is formed with a transverse opening, in which is secured a hollow bushing 7, through which the horizontal extension of the L-shaped support arm is adapted to project for axial movement therein.

A depending detachable arm member 8 is formed at one end with an eyelet in which the projecting end portion of the horizontal extension of the L-shaped arm is adapted to be secured. The lower end of this depending arm is provided with an elongated support 9 not substantially unlike the support 2, but in opposed relation thereto, and on the opposite side of the windshield 6. The support 9 is of substantially triangular cross section, as is the support member 2, and is formed with the right angular side walls 10.

The side walls 10 are formed with similar obliquely disposed slots in each of which one longitudinal edge of the respective blade members is adapted to be secured. The free longitudinal edges of these blades are sharpened for scraping relation against the opposite sides of the windshield from the blades 4. As in the construction of the support 2, the inner side of the support 9 is provided with a similar squeegee member 12.

In operation the driver will grip the handle 13, which is secured to the arm 8, and by a horizontal oscillating movement thereof will cause the opposed scrapers 4 and 11 respectively to remove whatever ice or frost 5 which has formed on the windshield.

Figure 2:
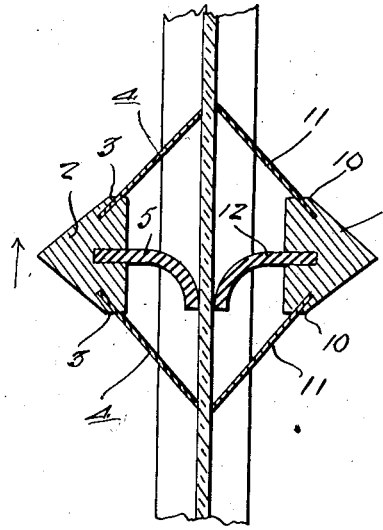
Fig. 2 is a sectional view taken approximately on the line 2—2 of Fig. 1, the same showing the squeegee flexed in the position to travel in the direction of the arrow.
Figure 3:
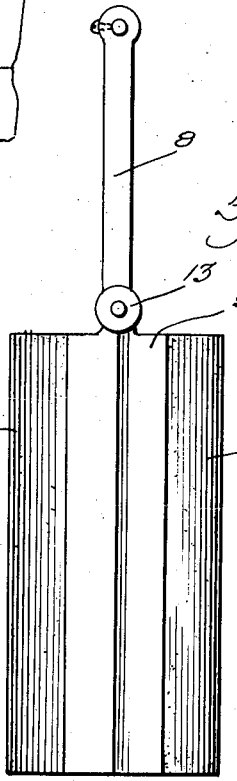
Fig. 3 is a rear elevation of the cleaner.

The blade members are thusly employed for breaking away the ice and scraping the frost from the windshield, while the squeegee members 5 and 12 respectively engage the windshield on opposite sides thereof, the function to thoroughly wipe the water from the windshield. The squeegee members being of substantially greater width than the distance between the inner surfaces of the supports 2 and 9 respectively, and the opposed surfaces of the windshield, must flex as is shown in the Fig. 2 of the drawing.

As is shown there, the longitudinal edge portions of the squeegee members are flexed so that the water will be effectively carried to the edge of the area to be cleaned on the windshield. Upon the reverse movement of the device, the squeegee member will flex to the opposite position from that shown in Fig. 2, so as to carry the water effectively to the opposite edge of the area to be cleaned.

It will be seen that I have constructed a novel windshield cleaner wherein the same is provided with scraping means as well as a wiper, whereby the windshield may be thoroughly scraped to remove any ice or frost formations thereon, and in addition thereto, to also cleanly wipe the area of the windshield to be cleaned.

Having thus described my invention, what I claim as new is:—

In a windshield cleaner comprising, an U-shaped member adapted to be pivotally supported by the windshield frame, so that its leg portions will depend at opposite sides of the windshield, a pair of elongated blocks, said block being substantially triangular in cross section, the upper end of each block being connected to the lower end of the respective arms, a pair of elongated scraper blades longitudinally secured to the inner side of each block, said blades being disposed outwardly in oblique relation to the inner side of the block and adapted to have their outer longitudinal edges engaging the windshield, the resilient squeegee strip arranged longitudinally on the inner side of the respective blocks and between said scraper blades, said squeegee being of a width greater than the distance between the inner side of the respective blocks and the plane of the outer edges of the blades, so that said squeegee will be in flexed position while in wiping contact with the windshield, and means for adjusting said U-shaped member at its bight portion for varying the pressure of the scraper blades and squeegees against the windshield.

In testimony whereof I affix my signature.

GEORGE W. KNUTSON.